United States Patent
Gibler et al.

(10) Patent No.: US 6,177,521 B1
(45) Date of Patent: Jan. 23, 2001

(54) HYDROGENATION OF POLYMERS

(75) Inventors: Carma Joleen Gibler, Houston; David Michael Austgen, Jr., Missouri City; Roy Arthur Parker, Houston, all of TX (US)

(73) Assignee: Shell Oil Company, Houston, TX (US)

( * ) Notice: Under 35 U.S.C. 154(b), the term of this patent shall be extended for 0 days.

(21) Appl. No.: 08/340,966

(22) Filed: Nov. 17, 1994

(51) Int. Cl.$^7$ ............... C08C 19/02; C08F 8/04; C08F 6/12
(52) U.S. Cl. ............ 525/338; 525/332.9; 525/339; 528/490; 528/499; 524/800
(58) Field of Search ............... 528/485, 486, 528/490, 499; 525/332.9, 338, 339

(56) References Cited

U.S. PATENT DOCUMENTS

| | | | |
|---|---|---|---|
| 3,700,633 | * 10/1972 | Wald et al. ............ | 525/339 |
| 3,700,748 | * 10/1972 | Winkler ............ | 525/314 |
| 4,992,529 | * 2/1991 | Hoxmeier ............ | 528/486 |
| 5,001,199 | * 3/1991 | Hoxmeier ............ | 525/338 |
| 5,281,696 | * 1/1994 | Gibler ............ | 528/485 |

* cited by examiner

*Primary Examiner*—Tae Yoon

(57) ABSTRACT

A method is provided to hydrogenate a polymer containing ethylenic unsaturation comprising the steps of: providing a solution or suspension of the polymer containing ethylenice unsaturation with an amount of Group VIII metal alkoxide or carboxylate and metal alkyl hydrogenation catalyst effective to permit hydrogenation of the ethylenic unsaturation upon exposure to hydrogen; exposing the polymer solution or suspension to a hydrogen partial pressure for a time period sufficient to hydrogenate greater than about 90 percent of the ethylenic unsaturation; adding additional Group VIII metal alkoxide or carboxylate and metal alkyl hydrogenation catalyst to the polymer solution or suspension after greater than about 90 percent of the ethylenic unsaturation has been hydrogenated; mixing the hydrogenated polymer solution or suspension with the additional Group VIII metal alkoxide or carboxylate and metal alkyl hydrogenation catalyst with an aqueous solution of an acid; and separating a hydrogenated polymer solution or suspension that contains less than about 0.8 percent by weight water from the aqueous solution. The invention utilizes a surprising discovery that addition of the hydrogenation catalyst above that necessary or desirable for hydrogenation of ethylenic unsaturation results in improved separation of the catalyst metals, and the aqueous phase, from the polymer solution or suspension.

7 Claims, No Drawings

HYDROGENATION OF POLYMERS

FIELD OF THE INVENTION

The present invention relates to an improved method to prepare hydrogenated polymers.

BACKGROUND TO THE INVENTION

Polymers that contain ethylenic unsaturation can be hydrogenated to improve properties, and in particular to improve stability. Such hydrogenation processes are disclosed in, for example, U.S. Pat. Nos. 3,700,633 and 3,700,748, the disclosures of which are incorporated herein by reference. These processes include combining a solution or suspension of the polymer with Group VIII metal alkoxide or carboxylate and a metal alkyl. Group VIII metals in general will function as the active metal in these systems, and in particular, nickel, iron, cobalt and palladium are known to be effective. This mixture is then contacted with hydrogen at an elevated pressure and temperature, resulting in hydrogenation of ethylenic unsaturation.

A particularly difficult aspect of these hydrogenation processes is removal of the hydrogenation catalyst metals after hydrogenation is complete. After hydrogenation is complete, the metal components are typically removed from the polymer solution by contacting the polymer solution with an aqueous phase of, for example, carboxylic acid, sulfuric acid or phosphoric acid. An oxidizing agent may also be used to react with the metal or metal compound either prior to or simultaneously with the carboxylic acid, sulfuric acid or phosphoric acid. The aqueous phase is then separated from the polymer solution.

Removal of the hydrogenation catalyst metal is important because small amounts of hydrogenation catalyst metal are detrimental to many polymer properties, including stability and color.

U.S. Pat. No. 4,992,529 discloses a method for separating metal contaminants from organic polymer solutions using a high molecular weight monocarboxylic acid in combination with an inorganic acid. Although this method can be effective for many polymer and metal combinations, it has been found to be less effective than what is desired for other combinations. In particular, when anionically polymerized polymers are initiated with lithium, and the lithium is present in the final polymer solution in relatively high concentrations, removal of both the lithium and nickel hydrogenation catalyst metal becomes particularly difficult, and relatively large amounts of the high molecular weight monocarboxylic acid is required.

Removal of metals from a hydrogenated polymer solution is affected by the amount of water remaining in the polymer cement after the metals removal step is complete. This is because the remaining metals are, after contact of the solution with an acidic aqueous solution, often concentrated in the small amount of water entrained within the polymer cement. Effective separation of the water from the polymer cement is necessary for the effective removal of metals.

It is therefore an object of the present invention to provide a method to hydrogenate polymers containing ethylenic unsaturation in a polymer cement wherein the hydrogenated polymer cement contains not more than about 0.8 percent by weight entrained water. In another aspect, it is an object to provide such a method wherein hydrogenation catalyst metals are effectively removed without addition of excessive amounts of a contaminant.

SUMMARY OF THE INVENTION

These and other objects of the invention are achieved by a method to hydrogenate a polymer containing ethylenic unsaturation comprising the steps of: providing a solution or suspension of the polymer containing ethylenic unsaturation with an amount of Group VIII metal alkoxide or carboxylate and metal alkyl hydrogenation catalyst effective to permit hydrogenation of the ethylenic unsaturation upon exposure to hydrogen; exposing the polymer solution or suspension to a hydrogen partial pressure for a time period sufficient to hydrogenate greater than about 90 percent of the ethylenic unsaturation; adding additional Group VIII metal alkoxide or carboxylate and metal alkyl hydrogenation catalyst to the polymer solution or suspension after greater than about 90 percent of the ethylenic unsaturation has been hydrogenated; mixing the hydrogenated polymer solution or suspension with the additional Group VIII metal alkoxide or carboxylate and metal alkyl hydrogenation catalyst with an aqueous solution of an acid; and separating a hydrogenated polymer solution or suspension that contains less than about 0.8 percent by weight water from the aqueous solution.

The present invention utilizes a surprising discovery that addition of nickel carboxylate and aluminum alkyl hydrogenation catalyst above that necessary or desirable for hydrogenation of ethylenic unsaturation results in improved separation of the catalyst metals, and the aqueous phase, from the polymer solution or suspension.

The polymer of the present invention is preferably a polymer derived by anionic polymerization of diolefin components such as butadiene or isoprene. These polymers are often block copolymers that include blocks of polymerized vinyl aromatics such as styrene.

The inclusion of the additional catalyst is particularly useful when the polymer has been prepared by anionic polymerization using an metal alkyl initiator such as a lithium alkyl, and the concentration of the metal initiator in the polymer solution or suspension is relatively great, for example, above about 20 ppm. These relatively high initiator metal contents occur when the polymers are of low molecular weights, as in certain viscosity index improvers and adhesives, and especially when multiple polymer arms are initiated and then coupled to form the final polymer molecules.

DETAILED DESCRIPTION OF SPECIFIC EMBODIMENTS OF THE INVENTION

The polymer of the present invention can be any polymer containing ethylenic unsaturation. Polybutadienes, polyisoprenes, or copolymers thereof, and block copolymers containing blocks that are primarily polybutadiene, polyisoprene or copolymers thereof are preferred because properties of these polymers are considerably improved by hydrogenation. The block copolymers are preferably block copolymers with a monovinyl aromatic such as styrene. Aromatic unsaturation is preferably not hydrogenated by the method of the present invention. These block copolymers are preferred because blocks of unhydrogenated monovinyl aromatics provide crystalline domains that have glass transition temperatures above which the polymers can be melt processed, and below which form crosslinks between polymer molecules. Such polymer can therefore be an elastomeric thermoplastic that is reprocessable.

Polymers that are prepared by anionic polymerization and then hydrogenated are typically hydrogenated in the solution or suspension in which the polymers are polymerized. Such solution or suspension therefore contains the metal ions used as initiators for the anionic polymerization. These initiator ions have been found to interfere with removal of hydrogenation catalyst metals when the initiator metals are present in a sufficiently high concentration. Initiator ion concentrations of around 20 ppm are often enough to cause relatively difficult catalyst metals removal.

Polymer hydrogenation catalysts useful in the present invention include nickel alkoxide or carboxylates, including 2-ethyl-1-hexanoates reduced with aluminum alkyl compounds. These hydrogenation catalysts are disclosed in, for example, U.S. Pat. Nos. 3,700,633 and 3,700,748.

Hydrogenation can be carried out with a hydrogen partial pressure of between about 1 atmosphere and 1500 psi. More typically, the hydrogen partial pressure is between about 100 and about 1200 psi. Hydrogenation can be carried out at temperatures of between about 25° C. and about 100° C. The time of hydrogenation under such conditions will typically be between about 0.1 and about 4 hours. Such hydrogenation will typically hydrogenate greater than 90 percent of the initial ethylenic unsaturation of the polymer.

The amount of catalyst used for initial hydrogenation in the present process is less than that which is needed for effective separation of metals from the hydrogenated polymer suspension or solution. Initially using the amount of hydrogenation catalyst useful for effective separation of metals from the hydrogenated polymer suspension or solution for initial hydrogenation of the polymer is not preferred. Use of such amount of catalyst can result in degradation of the polymer and hydrogenation of any styrene present in the polymer, and thus a hydrogenated polymer having inferior properties. But the presence of the excess catalyst does not significantly degrade the polymer after an initial hydrogenation of at least 90% of the initial ethylenic unsaturation. The additional nickel hydrogenation catalyst of the present invention may therefore be added at any time after 90 percent of the initial ethylenic unsaturation is hydrogenated. For example, if hydrogenation is performed in stages, the additional hydrogenation catalyst may be added after an initial stage and prior to a subsequent stage of hydrogenation.

Separation of metals from the polymer solution or suspension after hydrogenation is accomplished by washing the polymer solution or suspension with an acidic aqueous solution. A wide variety of acids are acceptable. Acids such as, for example, hydrosulfuric, hydrochloric, hydrofluoric, phosphoric and carboxylic acids are suitable. The amount of acid is an amount in excess of the molar amount of metals to be removed. The concentration of the acid is not critical, but in general, from about 0.01 to about 1 normal solutions are acceptable.

The polymer solution being contacted with the aqueous acid solution is preferably also contacted with an oxidizing agent. The oxidizing agent can be a stream of oxygen in nitrogen. About three molar percent oxygen in nitrogen is preferred. Other oxidation agents such as peroxides, could also be used.

Mixing of the polymer solution or suspension during the step of contacting the polymer solution or suspension is important. Mixing with an impeller having a tip speed of greater than about 1000 feet per minute results in sufficient contact between the aqueous and the hydrocarbon phases to result in effective metals removal. Separation of metals and water from the polymer solution or suspension has been found to be improved with impeller tip speeds that are equal to or greater than 1000 feet per minute. It is unexpected that increased tip speeds enable improved separations because common wisdom dictates that increased mixing would create finer droplets of water to be separated which would be counterproductive to separation of the two phases. Impeller tip speeds of between about 1000 and about 1600 feet per minute are preferred. Of course, types of mixing other than an impeller may be used and are effective, so long as the severity of the mixing is similar to that of an impeller having a tip speed greater than about 1000 feet per minute.

EXAMPLE

Experiments were performed utilizing two polymer solutions, each polymer being a copolymer. The copolymers were each about 69 percent by weight butadiene monomer units and about 31 percent by weight styrene monomer units and had a true molecular weight of about 47,5000. The copolymers were prepared in a solution of cyclohexane, using sec-butyllithium as an initiator, and sequential addition of the styrene and butadiene monomers to achieve polymerization of diblocks. The diblocks were then coupled with methyl benzoate with about a 30 percent coupling efficiency. After polymerization was complete, methanol was added to terminate the polymers. The final polymer solution was about 33 percent by weight polymer. The final copolymer solutions contained about 90 ppm by weight lithium. Hydrogenation was accomplished using a catalyst prepared by adding to the polymer solution nickel 2-ethyl-1-hexanoate reacted with triethylaluminum in a 2.1:1 molar ratio of aluminum to nickel and about 40 ppm by weight of nickel for Copolymer Solution 1 and 80 ppm by weight of nickel for Copolymer Solution 2. Hydrogen partial pressure was applied to the solutions for a time period of about 3 hours. The two Polymer Solutions were maintained under a nitrogen blanket after hydrogenation was complete and samples of about 1700 ml of polymer solution were subjected to extraction under varying conditions to demonstrate the present invention.

The extractions were performed in a five liter glass extraction vessel. The extractors contained two 6 flat-blade disk mixers of 2½ inch diameter and four ½ inch baffles located every 90 degrees around the inside circumference of the vessel. The pressure during extraction was maintained less than 30 psig and the temperature was 76.6° C. A 0.6:1 volumetric ratio of 0.9% by weight sulfuric acid solution to copolymer solution was added to the hydrogenated polymer solution. The mixer was immediately started and the components were mixed for 30 minutes at 1580 rpm. A 3 percent by volume mixture of oxygen in nitrogen was bubbled through the solution at a rate of 250 cc/min. At the end of 68 minutes, the mixer and oxygen/nitrogen addition was stopped and the contents were allowed to phase separate for 30 minutes. The aqueous phase was fully drained from the extractor. A polymer solution sample was then taken.

This process was repeated with additional nickel 2-ethyl-1-hexanoate reacted with triethylaluminum hydrogenation catalyst added to the hydrogenated polymer solution prior to the extraction step. A run was also made with additional 2-ethyl-1-hexanoate acid (2EHA) added to separate the effect of the acid from the metal catalyst component.

A portion of the polymer sample from each extraction was centrifuged at 20,000 G for thirty minutes to remove entrained water, and the amount of this water was measured. Prior to centrifugation the amount of nickel in the solutions was determined by atomic absorption. The TABLE below lists the amount of additive included in the hydrogenated polymer solution, the percent by weight water centrifuged from the polymer solution and the nickel concentration prior to centrifugation. All of the ppm values are based on the polymer solution.

TABLE

| Run No. | Copolymer Solution | ppm Ni added | 2EHA ppm | Water % weight | Ni ppm |
|---|---|---|---|---|---|
| A | 1 | 0 | 0 | 1.70 | 19.1 |
| B | 2 | 0 | 0 | 3.15 | 71.6 |
| C | 1 | 60 | 0 | 0.60 | 6.3 |
| D | 1 | 60 | 0 | 0.65 | 2.7 |
| E | 2 | 60 | 0 | 0.75 | 11.6 |
| F | 1 | 0 | 300 | 0.80 | 6.1 |
| G | 1 | 0 | 300 | 0.80 | 7.5 |
| H | 2 | 0 | 300 | 1.30 | 44.9 |
| I | 1 | 0 | 600 | 0.55 | 1.9 |

It can be seen from the TABLE that examples of the present invention, Samples C, D, and E, resulted in the acceptable removal of water by the one stage extraction process. Addition of 300 ppm of 2EHA (Samples F, G, and H) also improved the extraction process, but not to the extent that addition of the catalyst improved the extraction. The 300 ppm 2EHA is roughly equivalent to the 2EHA present in the additional 60 ppm nickel as hydrogenation catalyst. Addition of 600 ppm of 2EHA (Sample I) further improved both the water removal and nickel removal, but addition of this amount of 2EHA is generally not desirable.

The foregoing description of specific embodiments and examples are representative of the present invention, and reference is made to the following claims to determine the full scope of the present invention.

We claim:

1. A method to hydrogenate a polymer containing ethylenic unsaturation comprising the method comprising the steps of:

providing a solution or suspension of the polymer containing ethylenic unsaturation with an amount of Group VIII metal alkoxide or carboxylate and metal alkyl hydrogenation catalyst effective to permit hydrogenation of the ethylenic unsaturation upon exposure to hydrogen;

exposing the polymer solution or suspension to a hydrogen partial pressure for a time period sufficient to hydrogenate greater than about 90 percent of the ethylenic unsaturation;

adding additional Group VIII metal alkoxide or carboxylate and metal alkyl hydrogenation catalyst to the polymer solution or suspension after greater than about 90 percent of the ethylenic unsaturation has been hydrogenated, the amount of additional Group VIII metal alkoxide or carboxylate and metal alkyl hydrogenation catalyst effective to improve separation of hydrogenation catalyst metal from the polymer solution;

mixing the hydrogenated polymer solution or suspension with the additional Group VIII metal alkoxide or carboxylate and metal alkyl hydrogenation catalyst with an aqueous solution of an acid; and separating a hydrogenated polymer solution or suspension that contains less than about 0.8 percent by weight water from the aqueous solution.

2. The method of claim 1 wherein the polymer is a polymer consisting monomer units selected from the group comprising butadiene and isoprene.

3. The method of claim 1 wherein the polymer is an anionically polymerized block copolymer comprising at least one block comprising primarily monomer units of conjugated dienes and at least one block comprising primarily monomer units of monovinyl aromatics.

4. The method of claim 1 wherein the polymer solution or suspension after greater than about 90 percent of the ethylenic unsaturation has been hydrogenated but prior to addition of additional Group VIII metal alkoxide or carboxylate and metal alkyl hydrogenation catalyst, contains at least 20 ppm of lithium.

5. The method of claim 1 wherein the hydrogenation catalyst is a metal alkyl and nickel 2-ethyl-1-hexanoate.

6. The method of claim 5 wherein the metal alkyl is triethylaluminum.

7. The method of claim 1 wherein the metal is a nickel, and the additional amount of Group VIII metal alkoxide or carboxylate and nickel alkyl hydrogenation catalyst is about 60 ppm by weight of nickel based on the polyme; solution.

* * * * *